United States Patent
Oliveira et al.

(10) Patent No.: US 11,034,233 B2
(45) Date of Patent: Jun. 15, 2021

(54) METHOD AND APPARATUS FOR ACTIVE HEAT EXCHANGER

(71) Applicant: GM GLOBAL TECHNOLOGY OPERATIONS LLC, Detroit, MI (US)

(72) Inventors: Danilo A. Oliveira, Sterling Heights, MI (US); Jacob Wright, Grosse Pointe Woods, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 185 days.

(21) Appl. No.: 16/351,021

(22) Filed: Mar. 12, 2019

(65) Prior Publication Data

US 2020/0290452 A1    Sep. 17, 2020

(51) Int. Cl.
| | |
|---|---|
| B60R 22/00 | (2006.01) |
| E05F 15/00 | (2015.01) |
| G05D 1/00 | (2006.01) |
| G05D 3/00 | (2006.01) |
| G06F 7/00 | (2006.01) |
| G06F 17/00 | (2019.01) |
| B60K 11/04 | (2006.01) |
| F28F 5/00 | (2006.01) |
| F01P 7/10 | (2006.01) |

(52) U.S. Cl.
CPC ............... *B60K 11/04* (2013.01); *F28F 5/00* (2013.01)

(58) Field of Classification Search
CPC .......... B60K 11/04; B60K 11/085; F28F 5/00; F28D 11/00
USPC ................................................. 701/49; 165/98
See application file for complete search history.

(56) References Cited

U.S. PATENT DOCUMENTS

| | | | |
|---|---|---|---|
| 2008/0185125 A1* | 8/2008 | Prior ...................... | B60K 11/04 165/86 |
| 2018/0361846 A1* | 12/2018 | Dudar .................. | B60K 11/085 |

\* cited by examiner

*Primary Examiner* — Mahmoud S Ismail
(74) *Attorney, Agent, or Firm* — Lorenz & Kopf, LLP

(57) ABSTRACT

The present application generally relates to a method and apparatus for providing an active heat exchanger with dynamic positioning to improve vehicle aerodynamics. More specifically, aspects of the present disclosure relate to systems, methods and devices for a vehicle fascia having multiple airflow openings, at least one of having an active shutter system and wherein the active heat exchanger is positioned to respond to closing of one or more of the airflow openings when active aerodynamics are deployed.

20 Claims, 4 Drawing Sheets

METHOD AND APPARATUS FOR ACTIVE HEAT EXCHANGER

BACKGROUND

The present disclosure relates generally to vehicle heat exchangers, and more particularly, includes an active heat exchanger with dynamic positioning to improve vehicle aerodynamics. More specifically, aspects of the present disclosure relate to systems, methods and devices for a vehicle fascia having a first airflow opening with a large cross sectional area and a second airflow opening with a smaller cross sectional area. The active exchanger is positioned to respond to closing of one or more of the airflow openings when active aerodynamics are deployed.

Aerodynamics is a significant factor in vehicle design, including automobiles. Automotive aerodynamics is the study of the aerodynamics of road vehicles. The main goals of the study are reducing drag and wind noise, minimizing noise emission, and preventing undesired lift forces and other causes of aerodynamic instability at high speeds. Additionally, the study of aerodynamics may also be used to achieve downforce in high-performance vehicles in order to improve vehicle traction and cornering abilities. The study is typically used to shape vehicle bodywork for achieving a desired compromise among the above characteristics for specific vehicle use.

Goals of aerodynamic vehicle design include reducing drag, wind noise, and vehicular noise emission, as well as preventing undesired lift forces and other potential causes of aerodynamic instability. In order to achieve sufficient aerodynamic downforce, a vehicle body is typically configured with a number of front, side, underbody and/or rear aerodynamic elements such as air dams, splitters, spoilers, wings, and diffusers. As tradeoff exists between generated aerodynamic downforces, fuel economy, and top speed, the position of some aerodynamic elements may be actively controlled and thus selectively deployed in order to provide sufficient additional aerodynamic downforce. Reducing air intake into a vehicle may reduce the aerodynamic drag impact on a vehicle thereby improving aerodynamic performance but may reduce the cooling effectiveness of the powertrain during highway driving. It is desirable to avoid these problems to enable selectively deployed aerodynamic elements during highway and city driving.

The above information disclosed in this background section is only for enhancement of understanding of the background of the invention and therefore it may contain information that does not form the prior art that is already known in this country to a person of ordinary skill in the art.

SUMMARY

Disclosed herein are object detection methods and systems and related control logic for provisioning vehicle sensing and control systems, methods for making and methods for operating such systems, and motor vehicles equipped with onboard sensor and control systems. By way of example, and not limitation, there are presented various embodiments of active aerodynamic systems for vehicles and for active cooling systems working in concert with these systems disclosed herein.

In accordance with an aspect of the present invention, a vehicle cooling system comprising a fascia having a first airflow opening and a second airflow opening, a motorized slider, a heat exchanger mounted to the motorized slider, an active aerodynamic shutter system mounted within the first airflow opening, a detector for determining an open state of the active aerodynamic shutter system and a closed state of the active aerodynamic shutter system, and a controller for controlling a position of the motorized slider such that the heat exchanger is positioned within the first airflow opening in response to the detector detecting the open state and within the second airflow opening in response to the detector detecting the closed state.

In accordance with another aspect of the present invention an apparatus comprising a fascia having a first airflow opening and a second airflow opening, a shutter assembly mounted within the second airflow opening, wherein the shutter assembly has an open state and a closed state, a heat exchanger, and an actuator for moving the heat exchanger to a first position within the airflow of the first airflow opening in response to the shutter assembly being in the closed state and to a second position within the airflow of the second airflow opening in response to the shutter assembly being in the open state.

In accordance with another aspect of the present invention a method comprising detecting an opening of a shutter assembly in a vehicle front fascia airflow opening, initializing an actuator motor to position a heat exchanger within an airflow of the vehicle front fascia airflow opening, detecting a closing of the shutter assembly in the vehicle front fascia airflow opening, and initializing the actuator motor to position the heat exchanger within an airflow of an alternate vehicle front fascia airflow opening.

In accordance with other aspects of the present invention, the detector may comprise a light sensor and may be coupled to the vehicle data bus, the active aerodynamic shutter system is set to the open state in response to a vehicle speed being below a threshold speed, the active aerodynamic shutter system is set to the open state in response to an engine coolant temperature exceeding a threshold value, the motorized slider is a linear slider positioned in a vertical orientation behind the fascia, the first airflow opening is smaller than the second airflow opening, and the active aerodynamic shutter system is closed in response to the vehicle exceeding a predetermined speed.

The above advantage and other advantages and features of the present disclosure will be apparent from the following detailed description of the preferred embodiments when taken in connection with the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
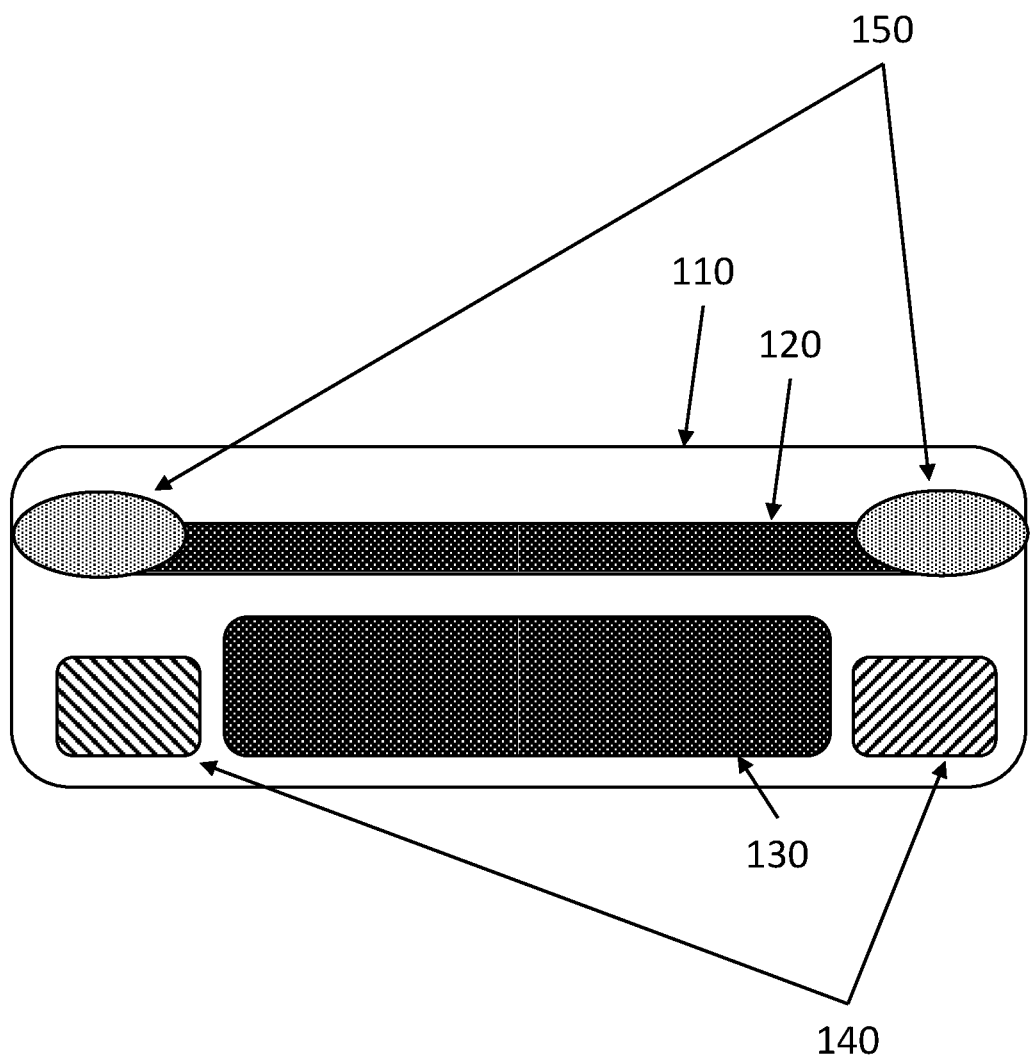
FIG. 1 illustrates an exemplary application of the method and apparatus for an active heat exchanger in a motor vehicle according to an embodiment of the present disclosure.

FIG. 1 schematically illustrates an exemplary application of the method and apparatus for an active heat exchanger in a motor vehicle 100 according to the present disclosure. In this exemplary embodiment, a front fascia 110 of a motor vehicle is shown. The exemplary front fascia 110 has an upper airflow opening 120 and a lower airflow opening 130. The exemplary front fascia 110 may also include brake cooling airflow ducts 140 and headlights 150.

The upper airflow opening 120 and/or the lower airflow opening 130 may include an active shutter assembly, such as active grille shutters, which open and close to reduce airflow into the engine compartment. For example, at high speeds, an active grille shutter assembly on the lower airflow opening 130 may close, leaving only the smaller upper airflow opening 120 open, thereby limiting the airflow into the engine compartment, but increasing aerodynamic efficiency. Conversely, when stopped or traveling at low speeds, the active grill shutter assembly may open, increasing airflow into the engine compartment and increasing cooling efficiency. A problem arises in that the vehicle coolant heat exchanger may not be ideally positioned in order to receive the maximum cooling efficiency from the upper airflow opening 120 at highway speeds and from the lower airflow opening 130 during slower speed operation.

Figure 2A:
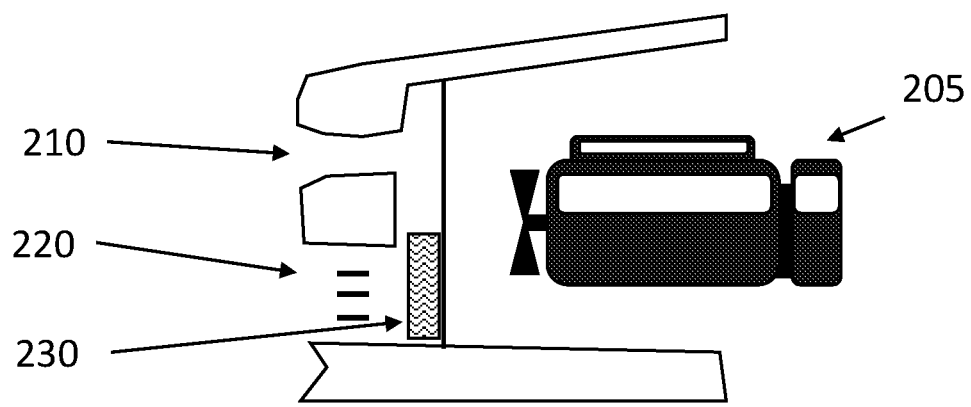
FIG. 2a illustrates a first view of an exemplary application of the method and apparatus for an active heat exchanger in a motor vehicle according to an embodiment of the present disclosure.

Turning now to FIG. 2a, a first diagram illustrating an exemplary application 200 for an active heat exchanger in a motor vehicle is shown. A side view of an exemplary engine compartment, with engine 215 is shown according to a low speed application. The exemplary engine compartment may include a front fascia with includes an upper airflow opening 210, a lower airflow opening 220, and active grill shutter system 220, a heat exchanger 230 and an actuator mechanism 240. In this application, the active grill shutter system 220 is open allowing for increased airflow. The heat exchanger has been lowered via the actuator mechanism 240 to a lower position to better benefit from the increased airflow through the lower airflow opening 220.

Figure 2B:
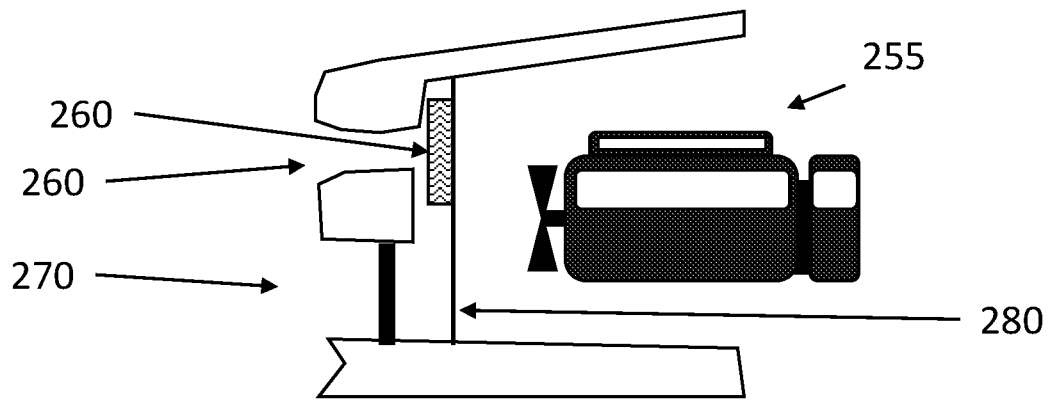
FIG. 2b illustrates a second view of an exemplary application of the method and apparatus for an active heat exchanger in a motor vehicle according to an embodiment of the present disclosure.

Turning now to FIG. 2b, a second diagram illustrating an exemplary application 201 for an active heat exchanger in a motor vehicle is shown. A side view of an exemplary engine compartment, with engine 255 is shown according to a high-speed application. The exemplary engine compartment may include a front fascia with includes an upper airflow opening 265, a lower airflow opening 270, and active grill shutter system 275, a heat exchanger 260 and an actuator mechanism 280. In this application, the active grill shutter system 275 is closed decreasing the airflow into the engine compartment but increasing aerodynamic efficiency of the vehicle. The heat exchanger has been raised via the actuator mechanism 280 to an upper position to better benefit from the airflow through the upper airflow opening 265.

Figure 3:
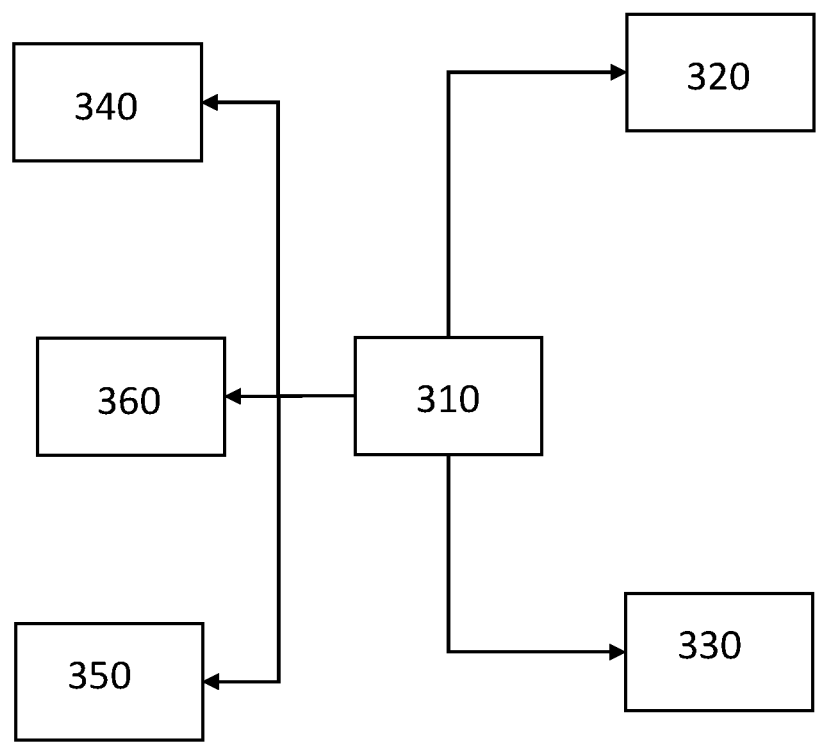
FIG. 3 shows a block diagram illustrating an exemplary system for an active heat exchanger in a motor vehicle according to an embodiment of the present disclosure.

Turning now to FIG. 3, a block diagram illustrating an exemplary system 300 for an active heat exchanger 300 is shown. The exemplary system 300 may include a processor 310, a vehicle sensor 320, a temperature sensor 330, a shutter system 340, and an actuator mechanism 350. In this exemplary embodiment, the vehicle sensor 330 may be operative to detect when the vehicle has exceeded a threshold speed and would benefit from increased aerodynamic efficiency. The sensor may do this by monitoring the vehicle controller area network bus (CAN), a global positioning sensor (GPS) or the like. The processor 310 is operative to monitor the vehicle sensor 330 and to determine when the vehicle reaches a speed exceeding the threshold speed. At this point the processor is operative to generate a first control signal to couple to the shutter system 340 and the actuator mechanism 350. The first control signal is configured to control the closing of the shutter system 340 and to control the actuator mechanism 350 such that the heat exchanger is placed in the high speed position. For example, in the exemplary embodiment shown in FIGS. 2a and 2b, the heat exchanger would be raised to the upper position such that the heat exchanger would be located within the airflow of the upper airflow opening. The processor is further operative to generate a second control signal wherein the second control signal is configured to control the opening of the shutter system 240 and to control the actuator mechanism 350 such that the heat exchanger is placed in the low speed position.

The exemplary system may further comprise a temperature sensor 330 for detecting an operating temperature of the vehicle liquid coolant. The processor 310 may be operative to monitor the output of the temperature sensor 310 to determine that the coolant temperature is below a lower threshold temperature and to generate a third control signal. In this exemplary embodiment, the shutter system 340 may be configured to close and the actuator mechanism 350 controlled to move the heat exchanger in line with the unrestricted airflow opening. Likewise, if the coolant temperature was higher than an upper threshold temperature, the processor 310 may be operative to generate a fourth control signal to couple to the shutter system 340 and the actuator mechanism 350 in order to open the shutters and to move the heat exchanger in line with the airflow opening housing the open shutters.

Figure 4:
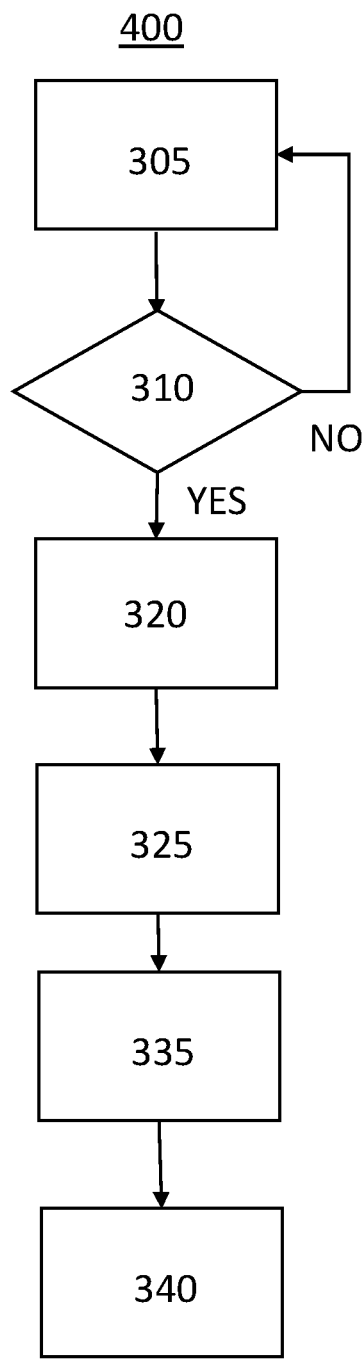
FIG. 4 shows a flowchart illustrating an exemplary method for an active heat exchanger according to an embodiment of the present disclosure The exemplifications set out herein illustrate preferred embodiments of the invention, and such exemplifications are not to be construed as limiting the scope of the invention in any manner.

Turning now to FIG. 4, a flow chart illustrating an exemplary method 400 for an active heat exchanger 400 is shown. The method is first operative to monitor a state of an active grill shutter system 405. In this exemplary embodiment, the active grill shutter may have an open state or a closed state. The method is then operative to detect a change in state of the active grill shutter system 410. If the active grill shutter system has been changed to an open state, the method is then operative to control the actuator such that the heat exchanger is moved to a position within the airflow of the airflow opening housing the active grill shutter system 430. If the active grill shutter system has been changed to a closed state, the method is then operative to control the actuator such that the heat exchanger is moved to a position within the airflow of an alternate airflow opening 420. In an exemplary embodiment, the heat exchanger position is changed by actuating a motor on an actuator mechanism, such as an endless screw or a motorized slider. The motorized slider may be a linear slider positioned in a vertical orientation behind the front fascia wherein the heat exchanger is affixed to the moving portion of the motorized slider. The method may be operative to detect if an active grill shutter state has been changed in response to an airflow measurement, a speed measurement of the vehicle, a light measurement using a light sensor mounted proximate to the active grill shutter, or a temperature measurement of the engine coolant.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle cooling system comprising:
   a fascia having a first airflow opening and a second airflow opening;
   a motorized slider;
   a heat exchanger mounted to the motorized slider;
   an active aerodynamic shutter system mounted within the first airflow opening;
   a detector for determining an open state of the active aerodynamic shutter system and a closed state of the active aerodynamic shutter system; and
   a controller for controlling a position of the motorized slider such that the heat exchanger is positioned within the first airflow opening in response to the detector detecting the open state and not within the airflow of the second airflow opening in response to the detector detecting the open state and within the second airflow opening in response to the detector detecting the closed state.

2. The vehicle cooling system of claim 1 wherein the detector comprises a light sensor.

3. The vehicle cooling system of claim 1 wherein the detector is coupled to a vehicle data bus.

4. The vehicle cooling system of claim 1 wherein the active aerodynamic shutter system is set to the open state in response to a vehicle speed being below a threshold speed.

5. The vehicle cooling system of claim 1 wherein the active aerodynamic shutter system is set to the open state in response to an engine coolant temperature exceeding a threshold value.

6. The vehicle cooling system of claim 1 wherein the motorized slider is a linear slider positioned in a vertical orientation behind the fascia.

7. The vehicle cooling system of claim 1 wherein the first airflow opening is smaller than the second airflow opening.

8. The vehicle cooling system of claim 1 wherein the active aerodynamic shutter system is closed in response to the vehicle exceeding a predetermined speed.

9. A method comprising:
   detecting an opening of a shutter assembly in a vehicle front fascia airflow opening;
   initializing an actuator motor to position a heat exchanger within an airflow of the vehicle front fascia airflow opening and not within an airflow of an alternate vehicle front facial airflow opening;
   detecting a closing of the shutter assembly in the vehicle front fascia airflow opening; and
   initializing the actuator motor to position the heat exchanger within an airflow of the alternate vehicle front fascia airflow opening.

10. The method of claim 9 wherein the shutter assembly is closed in response to a vehicle speed exceeding a threshold speed.

11. The method of claim 9 wherein the shutter assembly is opened in response to a vehicle speed falling below a threshold speed.

12. The method of claim 9 wherein the shutter assembly is opened in response to a vehicle coolant temperature exceeding a threshold temperature.

13. An apparatus comprising:
   a fascia having a first airflow opening and a second airflow opening;
   a shutter assembly mounted within the second airflow opening, wherein the shutter assembly has an open state and a closed state;
   a heat exchanger; and
   an actuator for moving the heat exchanger to a first position within the airflow of the first airflow opening in response to the shutter assembly being in the closed state and to a second position within the airflow of the second airflow opening and not within the airflow of the first airflow opening in response to the shutter assembly being in the open state.

14. The apparatus of claim 13 further comprising a detector for detecting the open state and the closed state.

15. The apparatus of claim 13 wherein the shutter assembly is controlled in response to a vehicle speed.

16. The apparatus of claim 13 wherein the shutter assembly is controlled in response to an engine coolant temperature.

17. The apparatus of claim 13 wherein the shutter assembly is set to the open state in response to an engine coolant temperature exceeding a threshold value.

18. The apparatus of claim 13 wherein the actuator is a linear slider positioned in a vertical orientation behind the fascia.

19. The apparatus of claim 13 wherein the first airflow opening is smaller than the second airflow opening.

20. The apparatus of claim 13 wherein the shutter assembly is closed in response to the vehicle exceeding a predetermined speed.

\* \* \* \* \*